United States Patent [19]

Wong et al.

[11] Patent Number: 4,615,868

[45] Date of Patent: Oct. 7, 1986

[54] APPARATUS FOR PURIFYING COPPER PHTHALOCYANINE PIGMENT

[75] Inventors: Matthew K. L. Wong; Rodney G. Schroeder; Thomas E. Donegan, all of Holland, Mich.

[73] Assignee: BASF Corporation, Wyandotte, Mich.

[21] Appl. No.: 425,784

[22] Filed: Sep. 28, 1982

[51] Int. Cl.[4] ............................................. G05D 7/00
[52] U.S. Cl. .................................. 422/111; 422/112; 422/267; 422/285; 260/705; 210/108; 210/137
[58] Field of Search ............... 210/711, 108, 137, 772, 210/181, 177, 178, 209, 225, 407, 409, 143, 774, 184, 186; 422/107, 110–112, 261, 267, 269, 275, 285; 260/705

[56] References Cited

U.S. PATENT DOCUMENTS

| | | | |
|---|---|---|---|
| 2,956,944 | 10/1960 | Logan | 210/772 |
| 3,084,119 | 4/1963 | Cabbage | 210/772 |
| 3,152,986 | 10/1964 | Bice | 210/772 |
| 3,443,692 | 5/1969 | Halsey | 210/110 |
| 4,151,080 | 4/1979 | Zuckerman | 210/111 |
| 4,342,638 | 8/1982 | Dahlstrom | 210/772 |

OTHER PUBLICATIONS

*Artisan Continuous Filter for the Processing Ind.,* Bull. #4060, Artisan Ind. Inc., Waltham, Ma., Nov. 1977.
*The Artisan Continuous Filter,* Artisan Ind. Inc., Waltham, Ma., Nov. 1977.
Bagdasarian et al., "Operational Features of Staged, High-Pressure, Thin-Cake Filters", *Filtration and Separation,* Nov. 1978.

Bennet and Myers, Momentum, Heat, and Mass Transfer, 2nd Edition, pp. 447–454.

*Primary Examiner*—David L. Lacey
*Attorney, Agent, or Firm*—Bernhard R. Swick

[57] ABSTRACT

An apparatus for purifying copper phthalocyanine pigment in a continuous process without the use of acid. This apparatus comprises a container for preparing a slurry of said pigment in water, a pump and a conduit for conducting the slurry from the container to the inlet of the pump, a first heating apparatus capable of heating the slurry to a temperature of at least about 75° C., a conduit for conducting the slurry from the pump to the first heating apparatus, a thin film pressure filter, and a conduit for conducting the slurry from the first heating apparatus to the thin film pressure filter. The apparatus is arranged such that the temperature of the slurry passing through the thin film pressure filter is close to the exit temperature of the slurry from the first heating apparatus. A product outlet is provided for the filter and a control valve is positioned in the product outlet.

The apparatus includes structure for washing filter cake comprising a source of wash water, a pump, and a conduit from the source of wash water to the inlet of the pump, heating device, and a conduit for conducting wash water from the outlet of the pump to the heating device. The heating device has sufficient capacity to provide wash water at a temperature approaching that of the slurry entering the filter. A conduit is provided for conducting the wash water from the heating device to the thin film pressure filter. The apparatus also includes control apparatus adapted to control the speed of both motors on both pumps in turn controlling the pressure of the slurry entering the filter and the pressure of the wash water entering the filter.

2 Claims, 1 Drawing Figure

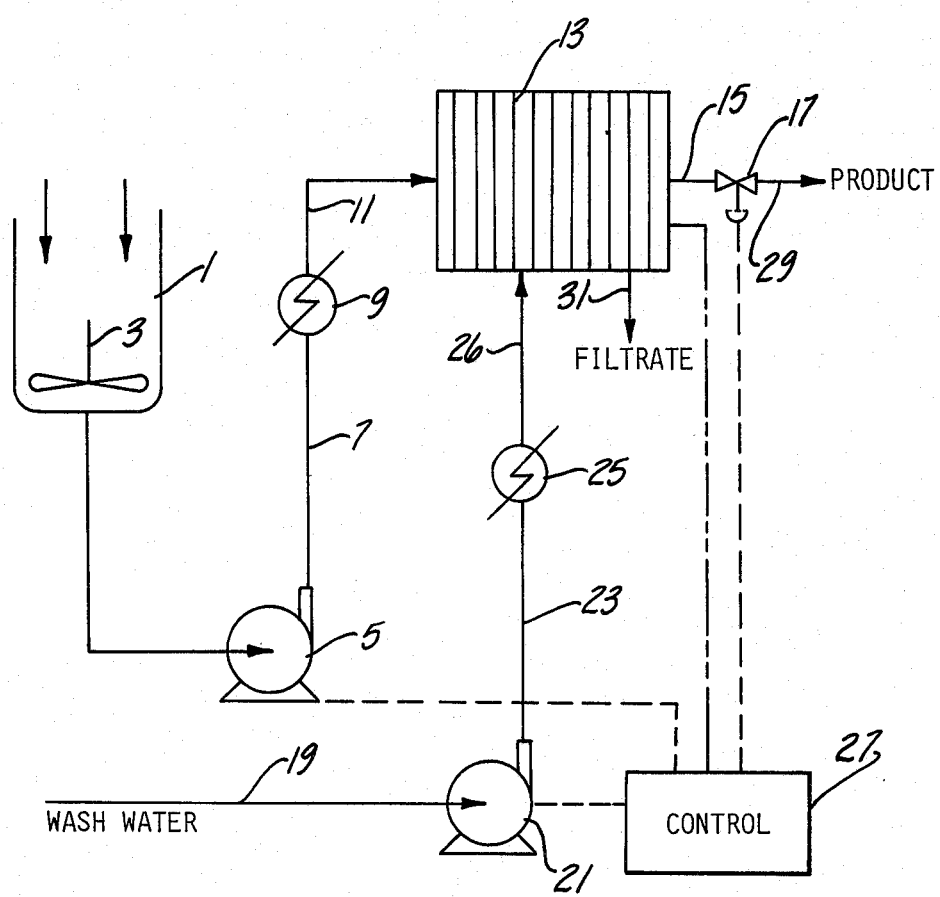

APPARATUS FOR PURIFYING COPPER PHTHALOCYANINE PIGMENT

BACKGROUND OF THE INVENTION

1. Field of the Invention

The present invention relates to a process for the purification of copper phthalocyanine pigments characterized by eliminating or substantially reducing equipment corrosion, material handling, safety and similar problems.

2. Prior Art

The introduction of phthalocyanine pigments in 1935 set new standards of excellence in the pigments consuming industries. They are characterized by their excellent light fastness, intensity, bleed and chemical resistance, extreme stability and exceptionally high tinting strength. Phthalocyanine pigments are restricted to the blue and green regions of the spectrum. Because of their excellent color values, working properties and low cost in addition to durability, the phthalocyanine blue and green pigments are used extensively.

The two processes most generally employed for producing copper phthalocyanine pigments are (1) heating phthalic anhydride, urea, a copper salt and a catalyst with or without a reaction medium such as chloronaphthalene or trichlorobenzene to 180°–200° C. and (2) heating phthalonitrile and a copper salt with or without a reaction medium or solid diluent. The product that results is generally a copper phthalocyanine blue pigment of about 65 to 70 percent purity. This is generally converted into a finely divided form by dry grinding. Such products are generally washed by methods well known to those skilled in the art. In general, the washing processes involve boiling the crude copper phthalocyanine blue in 10 percent of an acid, preferably HCl or $H_2SO_4$, filtering and washing with hot water at about 85° C. This results in a product that is about 95 percent pure which is a commercially pure product. This acid washing process has certain inherent disadvantages such as equipment corrosion, thus, problems of materials of construction, material handling and safety problems relevant to handling acid are presented.

| Statement of the Relevant Patents | | | |
|---|---|---|---|
| U.S. Pat. No. | Inventor | Issue Date | Assignee |
| 3,775,149 | Langley et al | 11/27/73 | Ciba-Geigy |
| 4,158,572 | Blackburn et al | 6/19/79 | Ciba-Geigy |

U.S. Pat. No. 3,775,149 discloses grinding an aqueous slurry of copper phthalocyanine in water which generates enough heat to raise the temperature to above 90° C. However, there is no teaching of filtering at this temperature but rather the pigment may be subjected to a conventional treatment such as treatment with hydrochloric acid at elevated temperature followed by filtering.

U.S. Pat. No. 4,158,572 discloses a phthalocyanine pigment process which comprises dry grinding the crude phthalocyanine then stirring the product in an aqueous medium containing a surfactant, followed by isolating the pigmentary product. The second step, i.e., the stirring with a surfactant may be accomplished at a temperature from 70° C. to the boil. Thus, a process of heating the slurry to a temperature of around 100° C. is taught by this patent. However, there is no teaching or disclosure of filtering the material at this temperature but rather the prior art acid treatment is relied on for purification in most instances.

DESCRIPTION OF THE DRAWING

The accompanying drawing is a schematic flow diagram illustrating the typical process and apparatus employed therein in accordance with the invention for continuous acid-free purification of copper phthalocyanine pigment.

SUMMARY OF THE INVENTION

This invention relates to either batch or continuous purification of copper phthalocyanine pigment such as about 65 to 85 percent purity crude prepared by a conventional process such as described above. The process of this invention comprises preparing a slurry by mixing the crude with hot water and heating the slurry in a heat exchanger, prior to filtration. The filter cake may be washed with hot water.

DESCRIPTION OF THE PREFERRED EMBODIMENT

It is well known that the shade of copper phthalocyanine varies according to the number of chlorine atoms present in the molecule. Thus, the blue shade of the unchlorinated copper phthalocyanine changes to a green-blue when 8 chlorine atoms are introduced and to a more intense green shade when 12 or more chlorine atoms are incorporated into the copper phthalocyanine molecule. As starting product for the purification process claimed, there may be employed unsubstituted copper phthalocyanine and halogenated copper phthalocyanine. The chlorinated product has a chlorine content of about 3 percent all the way up to the more intense green shades where 12 or more chlorine atoms are incorporated into the copper phthalocyanine molecule. The low chlorinated copper phthalocyanine product such as that having a chlorine content up to about 6 percent may include the so-called semichloro-copper phthalocyanine required for the preparation of pigments of the alpha modification stable to recrystalization.

With reference now more particularly to the drawing, the dry ground copper phthalocyanine crude is mixed with water at any practical temperature but preferably hot water such as conventional hot tap water in a suitable container (1) which is provided with an agitator (3). Container (1) may be heated by suitable means such as a steam sparger or steam coil or jacket (not shown) to a temperature of from about 80° C. to a full boil. The proportions of water and crude copper phthalocyanine in container (1) are such as to produce a slurry containing about 2 to 10 percent solids by weight. The hold time in container (1) may be up to 90 minutes, preferably no more than 30 minutes. The mixture is vigorously agitated to hold the slurry in a uniform suspension. The aqueous slurry is then pumped by means of a pump (5) through a conduit (7). The aqueous slurry then flows through a heat exchanger (9), such as a shell and tube type, wherein the aqueous slurry is heated by means of steam to a temperature of at least about 90° C. The aqueous slurry then flows through conduit (11) and filter (13). The pump (5) delivers a pressure such that the pressure of the slurry entering the filter (13) is about 200 to 300 psig, preferably about 230 to 260 psig. The temperature of the slurry on the discharge side of heat exchanger (9) should be high enough that the slurry entering filter (13) is at least about 75° C. and preferably about 100° C. to 115° C. for starting copper phthalocyanine crudes of about 75 to 85 percent purity. For lower purity crudes longer periods of time in heated container (1) and higher temperature leaving heat exchanger (9) such as about 125° C. may be required. In a preferred embodiment of this invention, particularly for a continuous process, filter (13) should be a thin film continuous pressure filter. Such filters are described in Bulletin No. 4060 entitled *Artisan Continuous Filter for the Processing Industries*, published Nov. 1977, by Artisan Industries Inc., 73 Pond Street, Waltham, Mass. 02254 and the article *Operational Features of Staged, High-Pressure, Thin-cake Filters* appearing in Filtration and Separation, Nov./Dec. 1978. For batch processing, any pressure filter capable of filtering water at 125° C. may be employed.

The product, a purified copper phthalocyanine filter cake, is discharged through conduit (15) and control valve (17). The filtrate is discharged in a conventional manner through conduit 31.

The purity of the filter cake can be increased by introducing a washing stream into the filter. Wash water can be introduced into the pressure filter for washing when the temperature and pressure are brought into line with the feed stream. This is accomplished by introducing the wash water by a conduit (19) to a pump (21). The wash water from the pump is forced through a conduit (23) to a heat exchanger such as a shell and tube type heat exchanger (25) and then through conduit (26) into the filter (13). In the heat exchanger (25) the wash water is heated by means of steam to a temperature approaching that of the slurry entering the filter through conduit (11). The pressure of the wash water entering the filter (13) through conduit (26) is about the same as the slurry entering the filter (13) through conduit (11).

Control valve (17) positioned in exit conduit (15) is a conventional control valve, of a type well known to those skilled in the art. In a typical installation the conventional control apparatus (27) receiving a signal proportional to torques from a watt meter (not shown) on the drive motor of the filter (13), positions the control valve (17) thus regulating the discharge of the filter cake product into a receiver (not shown). Also in the control apparatus (27) conventional pressure controllers measuring inlet pressures to the filter regulate through S.C.R. drives, the RPM of the feed and wash pumps maintaining constant operating pressures. The signals from the conventional control apparatus (27) are sent by electrical or pneumatic means through conventional circuitry. This may employ pneumatic or electrical means or a combination of both.

From the foregoing, it will be appreciated that the instant invention has many advantages, among which are (1) no acid required as a raw material, (2) little to no wash water required, (3) no acidic waste and the attendant disposal problems, (4) the work area becomes less hazardous, (5) there is less corrosion of materials of construction for tanks, agitators, filters, conduits, etc., (6) easier material handling, and (7) the resulting filter cake has high solids content.

For a more complete understanding of the invention, reference is made to the following illustrative examples thereof. All parts and percentages are by weight and all temperatures are in degrees centigrade unless otherwise indicated.

EXAMPLE 1

An aqueous slurry was prepared by mixing dry ground copper phthalocyanine blue pigment of 80 percent initial purity with hot water in a tank to produce an aqueous slurry containing 5 percent suspended solids. It was then fed by a positive displacement pump through a heat exchanger. The pump increased the pressure of the slurry to about 250 psig. The pump employed was a Moyno progressive cavity pump of the type described in Bulletin No. 100-A entitled *Moyno Progressive Cavity Pumps for the Processing Industries*, copyright 1975 by Moyno Pump Division, Robins & Myers Inc., Springfield, Ohio. The heat exchanger was a conventional shell and tube type heat exchanger. In the heat exchanger the slurry was heated to 100° C. after which it flowed to a thin film continuous pressure filter. The thin film continuous pressure filter was an Artisan Continuous Filter as described above. The resultant filter cake was 92.6 percent pure.

EXAMPLE 2

A 3 percent aqueous slurry of the same copper phthalocyanine blue pigment as Example 1 was prepared, fed at a pressure of 250 psig by means of a pump and passed through a heat exchanger all as described in Example 1. In the heat exchanger the slurry was heated to 104° C. from which it passed to a thin film continuous pressure filter also as described in Example 1. The resultant filter cake was 93.7 to 95.6 percent pure with a 48.4 percent to 50.6 percent solids content.

EXAMPLE 3

A 3 percent aqueous slurry of the same copper phthalocyanine blue pigment as Example 1 was prepared, heated and filtered employing a pump, heat exchanger and continuous film pressure filter all as described in Example 1. The temperature from the heat exchanger was 102° C. The resultant filter cake was 94.3 percent purity pigment with 49.6 percent solids content.

EXAMPLE 4

An aqueous slurry was prepared and filtered as described in Example 1 employing the apparatus of Example 1 with the exception that a 2 percent aqueous slurry of a different copper phthalocyanine blue pigment of approximately 80 percent purity was prepared, the temperature was 77° C. The resultant filter cake was 92.6 percent purity pigment with 46.8 percent solids content.

EXAMPLE 5

An aqueous slurry was prepared and filtered as described in Example 4 employing the apparatus of Example 1 with the exception that the slurry was a 3 percent aqueous slurry, of the same copper phthalocyanine blue pigment as Example 4. The resultant filter cake was 92.3 percent purity pigment with a 44.2 percent solids content.

EXAMPLE 6

The process and apparatus of Example 1 was employed in this Example. The initial slurry prepared was a 5 percent aqueous slurry of the same copper phthalocyanine blue pigment as Example 4. The temperature from the heat exchanger was 93° C. In this example wash water at 85° C. was introduced into the pressure filter at the same pressure as that of the slurry entering the filter for simultaneous cake washing. The resultant filter cake was 93.1 percent pure pigment.

Having thus described the invention, what is claimed is:

1. An apparatus for purifying copper phthalocyanine pigment in a continuous process without the use of acid which comprises a container for preparing a slurry of said pigment in water, a first pumping means having a motor conduit means for conducting said slurry from said container to the inlet of said first pumping means, first heating means capable of heating said slurry to a temperature of at least about 75° C., conduit means for conducting said slurry from said first pumping means to said first heating means, a thin film pressure filter, conduit means for conducting said slurry from said first heating means to said thin film pressure filter, the apparatus being arranged such that the temperature of said slurry passing through said thin film pressure filter is close to the exit temperature of said slurry from said first heating means, product outlet means from said filter, control valve means positioned in said product outlet means, means for washing filter cake formed on said filter comprising a source of wash water, second pumping means having a motor, conduit means from said source of wash water to the inlet of said second pumping means, second heating means, conduit means for conducting wash water from the outlet of said second pumping means to said second heating means, said second heating means having sufficient capacity to provide wash water at a temperature approaching that of said slurry entering said filter, further conduit means for conducting said wash water from said second heating means to said thin film pressure filter, control means constructed and arranged so as to control the speed of both motors on said pumping means, in turn controlling the pressure of said slurry entering said thin film pressure filter and the pressure of said wash water entering said thin film pressure filter, both of said pumping means being so controlled by said controller that the pressure of the slurry entering said thin film pressure filter and the pressure of said wash water entering said thin film pressure filter are approximately the same.

2. The apparatus of claim 1 wherein said slurry heating means and said wash water heating means comprise shell-and-tube heat exchangers and said water heating means includes steam as a heat exchanged fluid.

* * * * *